US012754034B2

(12) United States Patent
Du et al.

(10) Patent No.: US 12,754,034 B2
(45) Date of Patent: Oct. 6, 2026

(54) METHOD FOR ASSISTING IN TRAVEL ARRANGEMENT AND COMPUTER STORAGE MEDIUM

(71) Applicant: PATEO CONNECT+ TECHNOLOGY (SHANGHAI) CORPORATION, Shanghai (CN)

(72) Inventors: Fang Du, Shanghai (CN); Yang Sun, Shanghai (CN); Zhenkai Ying, Shanghai (CN); Hongren Shi, Shanghai (CN)

(73) Assignee: PATEO CONNECT+ TECHNOLOGY (SHANGHAI) CORPORATION, Shanghai (CN)

( * ) Notice: Subject to any disclaimer, the term of this patent is extended or adjusted under 35 U.S.C. 154(b) by 332 days.

(21) Appl. No.: 18/274,502

(22) PCT Filed: Aug. 13, 2021

(86) PCT No.: PCT/CN2021/112544

§ 371 (c)(1),
(2) Date: Jul. 27, 2023

(87) PCT Pub. No.: WO2022/160664

PCT Pub. Date: Aug. 4, 2022

(65) Prior Publication Data

US 2024/0094022 A1 Mar. 21, 2024

(30) Foreign Application Priority Data

Jan. 27, 2021 (CN) ........................ 202110113997.1

(51) Int. Cl.
*G05D 1/00* (2024.01)
*B60R 25/24* (2013.01)
*G01C 21/34* (2006.01)
*G01C 21/36* (2006.01)

(52) U.S. Cl.
CPC ............ *G01C 21/362* (2013.01); *B60R 25/24* (2013.01); *G01C 21/3423* (2013.01)

(58) Field of Classification Search
CPC .................................................... G01C 21/362
See application file for complete search history.

(56) References Cited

FOREIGN PATENT DOCUMENTS

| | | | |
|---|---|---|---|
| CN | 1667664 | A | 9/2005 |
| CN | 108106622 | A | 6/2018 |
| CN | 109360049 | A | 2/2019 |
| CN | 109726871 | A | 5/2019 |
| CN | 109849817 | A | 6/2019 |

(Continued)

OTHER PUBLICATIONS

The World Intellectual Property Organization (WIPO) International Search Report for PCT/CN2021/112544 Oct. 14, 2021 5 Pages (including translation).

(Continued)

*Primary Examiner* — Ramon A. Mercado
*Assistant Examiner* — Paul W Arellano
(74) *Attorney, Agent, or Firm* — Anova Law Group, PLLC

(57) ABSTRACT

Method for assisting in a travel arrangement includes receiving, by a mobile terminal, a travel instruction, the travel instruction including a destination; obtaining vehicle information of a vehicle corresponding to the mobile terminal; obtaining destination information of the destination; and assisting in the travel arrangement based on at least one of the vehicle information or the destination information.

17 Claims, 1 Drawing Sheet

(56) References Cited

FOREIGN PATENT DOCUMENTS

| | | | |
|---|---|---|---|
| CN | 110276463 | A | 9/2019 |
| CN | 110751831 | A | 2/2020 |
| CN | 110826743 | A | 2/2020 |
| CN | 111091658 | A | 5/2020 |
| CN | 111861624 | A | 10/2020 |
| WO | 2020090252 | A1 | 5/2020 |

OTHER PUBLICATIONS

Xuehong JI:" Cross-Boundary Integration and Convergence: Redefining the Automotive Industry" (1st Edition), China Machine Press, Jul. 31, 2017(Jul. 31, 2017), p. 111.

METHOD FOR ASSISTING IN TRAVEL ARRANGEMENT AND COMPUTER STORAGE MEDIUM

CROSS-REFERENCE TO RELATED APPLICATION

This application is a national stage application of International Application No. PCT/CN2021/112544, filed on Aug. 13, 2021, which claims priority to Chinese Patent Application No. 202110113997.1, filed on Jan. 27, 2021, the entire contents of all of which are incorporated herein by reference.

TECHNICAL FIELD

The present disclosure relates to the technical field of transportation technologies and, more particularly, to a method for assisting in a travel arrangement and a computer storage medium.

BACKGROUND

Under normal circumstances, when making a travel arrangement by means of an electronic device, such as a mobile phone, a wearable device, and any other mobile terminal, it is often necessary to first manually determine whether a possible travel mode is walking, or using a means of transportation (or transportation means), such as vehicles (e.g., cars), ships, aircrafts, and any other transportation means. If the transportation means is picked, the device also needs to determine whether to use the transportation means that you already have the right to use, or to rent other transportation means that you do not have the right to use. Then, based on the determined travel mode, further actions need to be taken in a corresponding application, such as picking up one transportation means that has been authorized to use, performing navigation, renting another transportation means that is not yet authorized to use, and so on. Moreover, when renting another transportation means that is not yet authorized to use, additional procedures such as deposit payment, return, and exchange may be required.

In many cases, the above-mentioned ways of making the travel arrangement are complicated, and more intelligence may be introduced for improvement.

SUMMARY

The present disclosure solves a technical problem of facilitating a simpler and more intelligent travel arrangement.

One aspect of the present disclosure provides a method for assisting in a travel arrangement. The method includes: receiving, by a mobile terminal, a travel instruction, the travel instruction including a destination; obtaining vehicle information of a vehicle corresponding to the mobile terminal; obtaining destination information of the destination; and assisting in the travel arrangement based on at least one of the vehicle information or the destination information.

In some embodiments, the mobile terminal includes a mobile phone.

In some embodiments, the mobile terminal includes an electronic key of the vehicle.

In some embodiments, the mobile terminal includes an application program, and the vehicle information includes vehicle information of the vehicle registered in the application program.

In some embodiments, the application program includes the electronic key of the vehicle.

In some embodiments, the travel instruction includes a voice instruction.

In some embodiments, obtaining the vehicle information of the vehicle corresponding to the mobile terminal and obtaining the destination information of the destination are performed sequentially.

In some embodiments: obtaining the vehicle information of the vehicle corresponding to the mobile terminal and obtaining the destination information of the destination are performed simultaneously.

In some embodiments, the vehicle information includes a first navigation distance between the mobile terminal and the vehicle.

In some embodiments, the destination information includes a second navigation distance between the mobile terminal and the destination.

In some embodiments, assisting in the travel arrangement based on at least one of the vehicle information or the destination information includes: in response to the first navigation distance being smaller than a first value and the second navigation distance being greater than a second value, arranging the vehicle to travel.

In some embodiments, assisting in the travel arrangement based on at least one of the vehicle information or the destination information further includes: providing a first navigation to the vehicle.

In some embodiments, assisting in the travel arrangement based on at least one of the vehicle information or the destination information further includes: activating a second navigation.

In some embodiments, the second navigation navigates from a location of the vehicle to the destination.

In some embodiments, the method further includes: in response to the vehicle being connected to the mobile terminal, activating the second navigation.

In some embodiments, assisting in the travel arrangement based on at least one of the vehicle information or the destination information further includes: in response to the first navigation distance being greater than the first value and the second navigation distance being greater than the second value, arranging other vehicle to travel.

In some embodiments, the vehicle information includes a driving range of the vehicle, and a driving distance between the location of the vehicle and the destination.

In some embodiments, assisting in the travel arrangement based on at least one of the vehicle information or the destination information further includes: in response to the driving range of the vehicle being smaller than the driving distance between the location of the vehicle and the destination, arranging the vehicle to refill or recharge an energy source as required for a trip or arranging the other vehicle to travel.

In some embodiments, assisting in the travel arrangement based on at least one of the vehicle information or the destination information further includes handling a rental service of the other vehicle.

In some embodiments, assisting in the travel arrangement based on at least one of the vehicle information or the destination information further includes using the vehicle as a voucher or a guarantee for renting the other vehicle.

In some embodiments, assisting in the travel arrangement based on at least one of the vehicle information or the destination information further includes receiving an electronic key of the other vehicle by the mobile terminal.

In some embodiments, assisting in the travel arrangement based on at least one of the vehicle information or the destination information further includes displaying at least one of a location of the other vehicle or a third navigation distance between the mobile terminal and the location of the other vehicle.

In some embodiments, assisting in the travel arrangement based on at least one of the vehicle information or the destination information further includes activating a third navigation to get to the location of the other vehicle.

In some embodiments, the destination information includes the second navigation distance between the mobile terminal and the destination; and assisting in the travel arrangement based on at least one of the vehicle information or the destination information further includes: in response to the second navigation distance being smaller than the second value, arranging to walk.

In some embodiments, assisting in the travel arrangement based on at least one of the vehicle information or the destination information further includes: activating the second navigation from the mobile terminal to the destination.

Another aspect of the present disclosure provides a method for assisting in a travel arrangement. The method includes: receiving, by a device terminal, a travel instruction, the travel instruction including a destination; obtaining transportation means information of a transportation means corresponding to the device terminal; obtaining destination information of the destination; and assisting in the travel arrangement based on at least one of the transportation means information or the destination information.

In some embodiments, the device terminal includes an electronic device.

In some embodiment, the device terminal includes a mobile terminal.

In some embodiments, the mobile terminal includes a mobile phone.

In some embodiments, the mobile terminal includes an electronic key of the transportation means.

In some embodiments, the mobile terminal includes an application program, and the transportation means information includes information of the transportation means registered in the application program.

In some embodiments, the application program includes the electronic key of the transportation means.

In some embodiments, the travel instruction includes a voice instruction.

In some embodiments, obtaining the transportation means information of the transportation means corresponding to the device terminal and obtaining the destination information of the destination are performed sequentially.

In some embodiments, obtaining the transportation means information of the transportation means corresponding to the device terminal and obtaining the destination information of the destination are performed simultaneously.

In some embodiments, the transportation means includes at least one of a car, a ship, or an aircraft.

In some embodiments, the transportation means information includes a first navigation distance between the mobile terminal and the transportation means.

In some embodiments, the destination information includes a second navigation distance between the mobile terminal and the destination.

In some embodiments, assisting in the travel arrangement based on at least one of the transportation means information or the destination information includes: in response to the first navigation distance being smaller than a first value and the second navigation distance being greater than a second value, arranging the transportation means to travel.

In some embodiments, assisting in the travel arrangement based on at least one of the transportation means information or the destination information further includes: providing a first navigation to the transportation means.

In some embodiments, assisting in the travel arrangement based on at least one of the transportation means information or the destination information further includes: activating a second navigation.

In some embodiments, the second navigation navigates from a location of the transportation means to the destination.

In some embodiments, the method further includes: in response to the transportation means being connected to the mobile terminal, activating the second navigation.

In some embodiments, assisting in the travel arrangement based on at least one of the transportation means information or the destination information further includes: in response to the first navigation distance being greater than the first value and the second navigation distance being greater than the second value, arranging other transportation means to travel.

In some embodiments, the transportation means information includes a driving range of the transportation means, and a driving distance between the location of the transportation means and the destination.

In some embodiments, assisting in the travel arrangement based on at least one of the transportation means information or the destination information further includes: in response to the driving range of the transportation means being smaller than the driving distance between the location of the transportation means and the destination, arranging the transportation means to refill or recharge an energy source as required for a trip or arranging the other transportation means to travel.

In some embodiments, assisting in the travel arrangement based on at least one of the transportation means information or the destination information further includes handling a rental service of the other transportation means.

In some embodiments, assisting in the travel arrangement based on at least one of the transportation means information or the destination information further includes using the transportation means as a voucher or a guarantee for renting the other transportation means.

In some embodiments, assisting in the travel arrangement based on at least one of the transportation means information or the destination information further includes receiving an electronic key of the other transportation means by the mobile terminal.

In some embodiments, assisting in the travel arrangement based on at least one of the transportation means information or the destination information further includes displaying at least one of a location of the other transportation means or a third navigation distance between the mobile terminal and the location of the other transportation means.

In some embodiments, assisting in the travel arrangement based on at least one of the transportation means information or the destination information further includes activating a third navigation to get to the location of the other transportation means.

In some embodiments, the destination information includes the second navigation distance between the mobile terminal and the destination; and assisting in the travel arrangement based on at least one of the transportation means information or the destination information further includes: in response to the second navigation distance being smaller than the second value, arranging to walk.

In some embodiments, assisting in the travel arrangement based on at least one of the transportation means information or the destination information further includes: activating the second navigation from the mobile terminal to the destination.

Another aspect of the present disclosure provides a computer storage medium. The computer storage medium stores a computer program including program instructions. When being executed by a processor, the program instructions cause the processor to perform the disclosed method for assisting in the travel arrangement.

The technical solution of the embodiments of the present disclosure facilitates the simpler and more intelligent travel arrangement.

The embodiments of the present disclosure will be described in detail below with reference to the accompanying drawings.

DETAILED DESCRIPTION OF THE EMBODIMENTS

Figure 1:
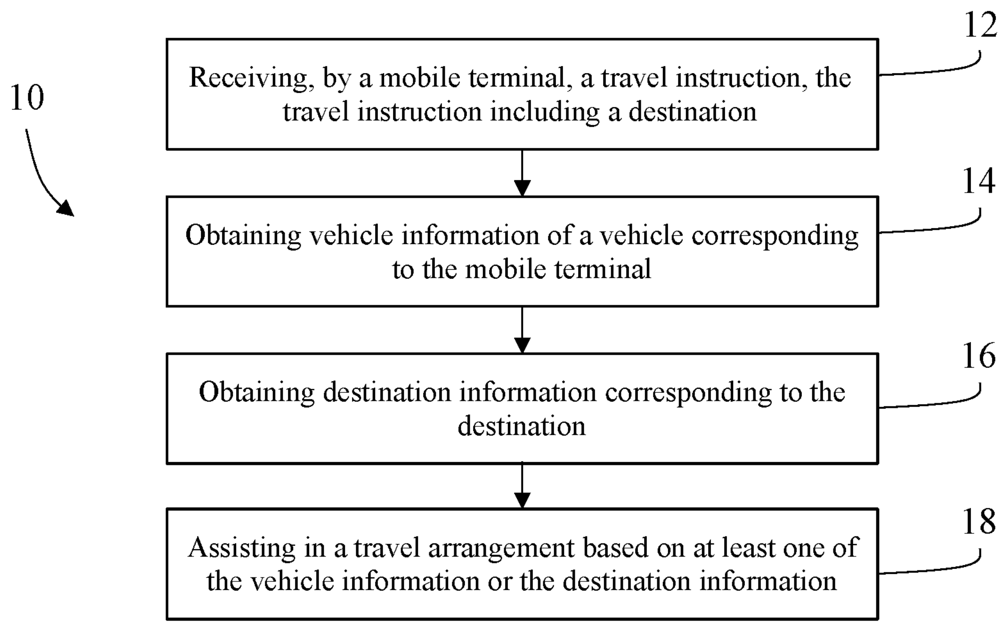
FIG. 1 is a flowchart of an exemplary method for assisting in a travel arrangement according to some embodiments of the present disclosure.

FIG. 1 is a flowchart of an exemplary method for assisting travel arrangement according to some embodiments of the present disclosure. Referring to FIG. 1, the method for assisting travel arrangement 10 includes: receiving, by a mobile terminal, a travel instruction, the travel instruction including a destination (12); obtaining vehicle information of a vehicle corresponding to the mobile terminal (14); obtaining destination information corresponding to the destination (16); and assisting in a travel arrangement based on at least one of the vehicle information or the destination information (18).

The embodiments of the present disclosure facilitate easier and more intelligent travel arrangements.

In the embodiments of the present disclosure, unless otherwise specified, the mobile terminal, also referred to as a mobile communication terminal, refers to a computer device that can be used on the move, and may include a mobile phone, a notebook computer, a tablet computer, an e-reader, and the like. In some embodiments, the mobile terminal is a mobile phone.

In the embodiments of the present disclosure, unless otherwise specified, the vehicle can functionally communicate with people, with the outside world (e.g., electronic equipment such as mobile terminals), and/or with components, devices, equipment, and systems included therein. Examples of the components, devices, equipment, and systems included in the vehicle may be related to information acquisition, information processing, information storage, information display, central control, controls, audio and video, maps, and navigation, etc.

The mobile terminal may correspond to the vehicle in any suitable manner. In some embodiments, a user authorized to use the mobile terminal is also authorized to use the vehicle, such that the mobile terminal corresponds to the vehicle. The reasons why the user has the right to use the mobile terminal may include owning, possessing, renting, and being permitted to use the mobile terminal. The reasons why the user has the right to use the vehicle may include owning, possessing, renting, and being permitted to use the vehicle. In some embodiments, the mobile terminal includes an electronic key of the vehicle. The electronic key may electronically open or close the vehicle. The electronic key can be a Bluetooth key or a near field communication (NFC) key.

In some embodiments, the mobile terminal includes an application program (or an application), and the vehicle information includes information of the vehicle registered in the application program. The application program can be used to collect, call, obtain, store, and display the vehicle information, and can be used to identify, lock/unlock, connect the vehicle, and determine a location and status of the vehicle. The vehicle information may include relevant information collected, invoked, acquired, stored, and displayed by the application program for identifying, locking/unlocking, connecting the corresponding vehicle, and determining the location, status, and other information of the corresponding vehicle.

In some embodiments, the application program includes the electronic key of the vehicle. Thus, the application program can open and close the vehicle electronically via Bluetooth, NFC, and the like.

The travel instruction can be presented in any suitable manner for the mobile terminal to receive. In some embodiments, the mobile terminal can use the application program as a port to receive the travel instruction. In some embodiments, the travel instruction includes a voice instruction. The voice instruction is easy to operate and intelligent, and can help free the user's hands to do other things.

Obtaining the vehicle information of the vehicle corresponding to the mobile terminal (14) may be performed by the mobile terminal, or may be performed by a server connected to the mobile terminal. When obtaining the vehicle information of the vehicle corresponding to the mobile terminal (14) is performed by the mobile terminal, it may be performed by the application program. Obtaining the vehicle information of the vehicle corresponding to the mobile terminal (14) can be performed automatically without manual intervention, thereby facilitating relatively simple and intelligent travel arrangements.

Obtaining the destination information corresponding to the destination (16) can be performed by the mobile terminal, or by a server connected to the mobile terminal. When obtaining the destination information corresponding to the destination (16) is performed by the mobile terminal, it may be performed by the application program. Obtaining the destination information corresponding to the destination (16) can be performed automatically without manual intervention, thereby assisting travel arrangements in a relatively simple and intelligent manner.

In some embodiments, obtaining the vehicle information of the vehicle corresponding to the mobile terminal (14) and obtaining the destination information corresponding to the destination (16) are performed successively. That is, obtaining the vehicle information of the vehicle corresponding to the mobile terminal (14) may be performed first, and then obtaining the destination information corresponding to the destination (16) may be performed. Conversely, obtaining the destination information corresponding to the destination (16) can also be performed first, and then obtaining the vehicle information of the vehicle corresponding to the mobile terminal (14) can be performed.

In some embodiments, obtaining the vehicle information of the vehicle corresponding to the mobile terminal (14) and obtaining the destination information corresponding to the destination (16) are performed simultaneously.

The vehicle information may include any information related to the vehicle in the embodiments of the present disclosure, and may be related to a location of the vehicle. In some embodiments, the vehicle information includes a first navigation distance between the mobile terminal and the vehicle.

In the embodiments of the present disclosure, unless otherwise specified, "first", "second", "third", "fourth", and similar terms are not used to represent sequence, priority, etc., but only for help to distinguish one from the other.

The destination information may include any information related to the destination in the embodiments of the present disclosure. In some embodiments, the destination information includes a second navigation distance between the mobile terminal and the destination. When the mobile terminal is located in the vehicle, the second navigation distance between the mobile terminal and the destination may also be the second navigation distance between the vehicle and the destination.

Assisting in the travel arrangement based on at least one of the vehicle information or the destination information (18) can be performed by the mobile terminal, or by a server connected to the mobile terminal. If assisting in the travel arrangement based on at least one of the vehicle information or the destination information (18) is performed by the mobile terminal, it may be performed by the application program. Assisting in the travel arrangement based on at least one of the vehicle information or the destination information (18) can be performed automatically without manual intervention, thereby assisting in the travel arrangement more conveniently and intelligently.

In some embodiments, assisting in the travel arrangement based on at least one of the vehicle information or the destination information (18) includes: if the first navigation distance is smaller than a first value and the second navigation distance is greater than a second value, arranging the vehicle to travel. The first value and the second value can be set and selected in advance as required. For example, the first value may be hundreds of meters, no more than 1 kilometer, or no more than 10 kilometers, and the second value may be several kilometers, greater than or equal to 1 kilometer, or greater than or equal to 2 kilometers.

In some embodiments, assisting in the travel arrangement based on at least one of the vehicle information or the destination information includes: providing the corresponding vehicle with a first navigation. For example, when the first navigation distance is greater than 0, the first navigation may be provided as required. The first navigation may be provided by the mobile terminal. When the first navigation is provided by the mobile terminal, it may be provided by the application program.

In some embodiments, assisting travel arrangement based on at least one of the vehicle information or the destination information (18) further includes: activating a second navigation of the vehicle. The second navigation may be activated by the mobile terminal, or by a server connected to the mobile terminal and the vehicle, or by the vehicle. The activation of the second navigation can be performed automatically without manual intervention, thereby facilitating easier and more intelligent travel.

In some embodiments, the second navigation is navigation from the location of the vehicle to the location of the destination. In this way, reaching the location of the destination from the location of the vehicle may be facilitated. When the mobile terminal is located in the vehicle, the location of the vehicle is also the location of the mobile terminal.

Before the second navigation is activated, the vehicle and the mobile terminal may be in a connected state or in an unconnected state. In some embodiments, when the vehicle and the mobile terminal are in the connected state, the second navigation is activated. In this way, the second navigation may be activated by the mobile terminal. For example, the second navigation may be activated directly by the application program of the mobile terminal, without using the mobile terminal to provide the second navigation, and without manually operating the vehicle. That is, the vehicle may provide the second navigation, thereby facilitating easier and more intelligent travel.

In some embodiments, assisting in the travel arrangement based on at least one of the vehicle information or the destination information (18) further includes: if the first navigation distance is greater than the first value and the second navigation distance is greater than the second value, arranging other vehicle to travel. The first value and the second value can be set and selected in advance as required. For example, the first value may be hundreds of meters, no more than 1 kilometer, or no more than 10 kilometers, and the second value may be several kilometers, greater than or equal to 1 kilometer, or greater than or equal to 2 kilometers.

In the embodiments of the present disclosure, the other vehicle may be any vehicle that has not yet corresponded to the mobile terminal, such as a vehicle that has not been registered in the application program of the mobile terminal and has right to use, or a vehicle that has not obtained a use license and needs to be rented. The other vehicle may be a motor vehicle or a non-motor vehicle.

In the embodiments of the present disclosure, the vehicle information may include any information related to the vehicle, and may be related to a status and a location of the vehicle. In some embodiments, the vehicle information includes a driving range of the vehicle, and a driving distance between the vehicle and the destination. The driving distance may be a navigation distance between the vehicle and the destination.

In some embodiments, assisting in the travel arrangement based on at least one of the vehicle information or the destination information (18) further includes: if the driving range of the vehicle is less than the driving distance between the vehicle and the destination, arranging the vehicle to refill or recharge an energy source as required for a trip or arranging other vehicle to travel. The energy source may be fuel, electric energy, and the like.

In some embodiments, assisting in the travel arrangement based on at least one of the vehicle information or the destination information (18) further includes: handling a rental service of other vehicle. The handling of the rental service of the other vehicle may be performed by the mobile terminal, or by a server connected to the mobile terminal. If performed by the mobile terminal, it may be performed by the application program.

The handling of the rental service of the other vehicles can be done automatically without manual intervention, thereby facilitating easier and more intelligent travel arrangements.

In some embodiments, assisting in the travel arrangement based on at least one of the vehicle information or the destination information (18) further includes: using the vehicle as a voucher or a guarantee for renting the other vehicle. In this way, it can help to omit additional processes such as payment and refund of deposits, and the travel can be arranged more easily and intelligently. When the user does not return the other vehicle or the returned vehicle has a problem, the user can be found and tracked according to the vehicle, or the vehicle of the user can be locked or apprehended.

In some embodiments, assisting in the travel arrangement based on at least one of the vehicle information or the destination information (18) includes: receiving by the mobile terminal an electronic key of the other vehicle. Thus, it facilitates picking up the other vehicles and making the travel arrangement more easily and intelligently. The electronic key of the other vehicle may be received by the application program.

In some embodiments, assisting in the travel arrangement based on at least one of the vehicle information or the destination information (18) further includes: displaying at least one of a location of the other vehicle or a third navigation distance between the mobile terminal and the other vehicle. The mobile terminal may, for example via the application program, display at least one of the location of the other vehicle or the third navigation distance between the mobile terminal and the other vehicle to provide assistance of going to and picking up the other vehicle.

In some embodiments, assisting in the travel arrangement based on at least one of the vehicle information or the destination information (18) further includes: activating the third navigation to the other vehicle. The mobile terminal may, for example, activate the third navigation through the application program to provide assistance for going to and picking up the other vehicle.

In the embodiments of the present disclosure, the destination information may include any information related to the destination. In some embodiments, the destination information includes the second navigation distance between the mobile terminal and the destination, and assisting in the travel arrangement based on at least one of the vehicle information or the destination information (18) further includes: if the second navigation distance is less than the second value, arranging to walk. The second value can be set and selected in advance as required. For example, the second value may be several kilometers, greater than or equal to 1 kilometer, or greater than or equal to 2 kilometers.

In some embodiments, assisting in the travel arrangement based on at least one of the vehicle information or the destination information (18) further includes: activating the second navigation between the mobile terminal and the destination. The mobile terminal may initiate the second navigation, for example via the application program, to provide assistance for getting to the destination.

Figure 2:
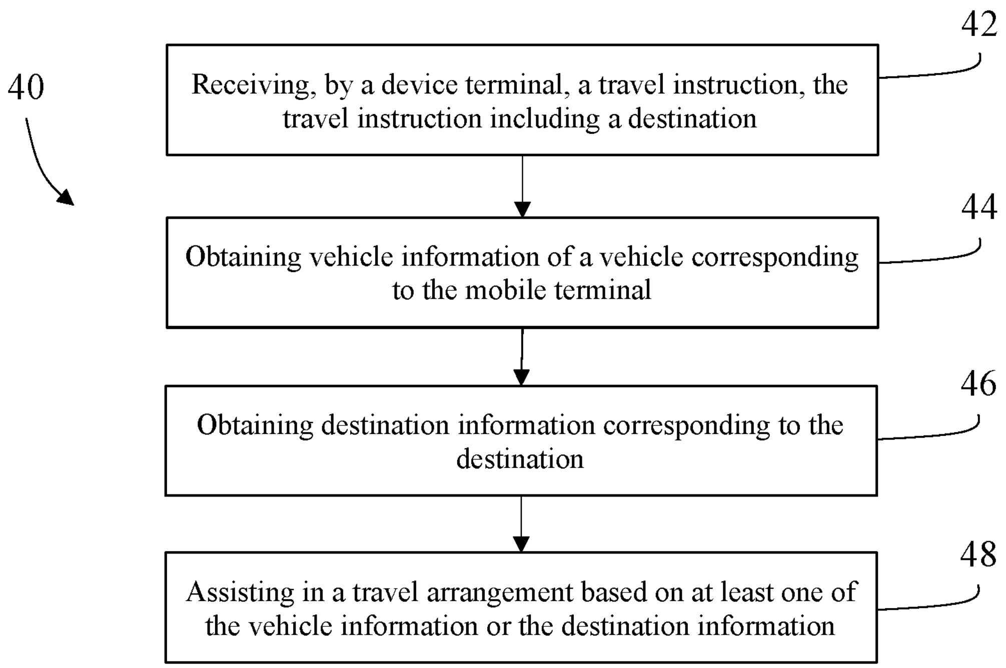
FIG. 2 is a flowchart of another exemplary method for assisting in a travel arrangement according to some embodiments of the present disclosure.

FIG. 2 is a flowchart of another exemplary method for assisting travel arrangement according to some embodiments of the present disclosure. The present disclosure also provides a method 40 for assisting travel arrangements. The method 40 includes: receiving, by a device terminal, a travel instruction (42), the travel instruction including a destination; obtaining transportation means information of a transportation means corresponding to the device terminal (44); obtaining destination information of the destination (46); and assisting in a travel arrangement based on at least one of the transportation means information or the destination information (48).

The embodiments of the present disclosure facilitate easier and more intelligent travel arrangements.

The device terminal may be any device capable of receiving the travel instruction. In some embodiments, the device terminal includes an electronic device. The electronic device may include electronic components such as integrated circuits, transistors, and electronic tubes, may apply electronic technology and software (e.g., application programs) in operation, and may include electronic computers, electronic computer-controlled robots, and digital or program-controlled systems.

In some embodiments, the device terminal includes a mobile terminal. In the embodiments of the present disclosure, unless otherwise specified, the mobile terminal, also referred to as a mobile communication terminal, refers to a computer device that can be used on the move, and may include a mobile phone, a notebook computer, a tablet computer, an e-reader, and the like. In some embodiments, the mobile terminal is a mobile phone.

The mobile terminal may correspond to a transportation means in any suitable manner. In some embodiments, the user authorized to use the mobile terminal is also authorized to use the transportation means, such that the mobile terminal corresponds to the transportation means. The reason why the user has the right to use the mobile terminal may include owning, possessing, renting, and being permitted to use the mobile terminal. The reason why the user has the right to use the transportation means may include owning, possessing, renting, and being permitted to use the transportation means. Optionally, the mobile terminal includes an electronic key of the transportation means. The electronic key may electronically open or close the transportation means. The electronic key can be a Bluetooth key or a near field communication (NFC) key.

In some embodiments, the mobile terminal includes an application program, and transportation means information of the transportation means includes information of the transportation means registered in the application program. The application program can be used to collect, call, obtain, store, and display the information of the transportation means, to identify, lock/unlock, and connect to the transportation means, and to determine a location and status of the transportation means. The transportation means information of the transportation means may include relevant information collected, invoked, acquired, stored, and displayed by the application program for identifying, switching, connecting, and determining the location and status of the transportation means.

In some embodiments, the application program includes the electronic key of the transportation means. Thus, the application program can open and close the transportation means electronically via Bluetooth, NFC, or the like.

The travel instruction can be presented in any suitable manner for the mobile terminal to receive. In some embodiments, the mobile terminal can use the application program as a port to receive travel instruction. In some embodiments, the travel instruction includes a voice instruction. The voice instruction is easy to operate and intelligent, and can help free the user's hands to do other things.

Obtaining the transportation means information of the transportation means corresponding to the mobile terminal (44) may be performed by the mobile terminal, or by a server connected to the mobile terminal. When obtaining the transportation means information of the transportation means corresponding to the mobile terminal (44) is performed by the mobile terminal, it may be performed by the application program. Obtaining the transportation means information of the transportation means corresponding to the mobile terminal (44) can be performed automatically without manual intervention, thereby facilitating relatively simple and intelligent travel arrangements.

Obtaining the destination information corresponding to the destination (16) can be performed by the mobile terminal, or by a server connected to the mobile terminal. When obtaining the destination information corresponding to the destination is performed by the mobile terminal, it may be performed by the application program. Obtaining the destination information corresponding to the destination can be performed automatically without manual intervention, thereby facilitating relatively simple and intelligent travel arrangements.

In some embodiments, obtaining the transportation means information of the transportation means corresponding to the mobile terminal (44) and obtaining the destination information of the destination (46) are performed successively. That is, obtaining the transportation means information of the transportation means corresponding to the mobile terminal (44) can be performed first, and then obtaining the destination information of the destination can be performed. Conversely, obtaining the destination information of the destination (46) may also be performed first, followed by obtaining the transportation means information of the transportation means corresponding to the mobile terminal (44).

In some embodiments, obtaining the transportation means information of the transportation means corresponding to the mobile terminal (44) and obtaining the c destination information of the destination are performed simultaneously.

In the embodiments of the present disclosure, unless otherwise specified, the transportation means may include all man-made devices used for human transportation or other transportation, and which can facilitate the travel arrangement. In some embodiments, the transportation means includes at least one of a car, a ship, or an aircraft.

In the embodiments of the present disclosure, unless otherwise specified, the transportation means can be functionally connected with people, with the outside world (e.g., mobile terminals such as mobile phones, electronic devices, device terminals), and/or the transportation means can also facilitate information communication between components, devices, apparatuses, and systems included in the transportation means. For examples, the components, devices, apparatuses, and systems included in the transportation means may be related to information acquisition, information processing, information storage, information display, central control, other control, audio-visual, maps, navigation, etc.

In the embodiments of the present disclosure, the transportation means information of the transportation means may include any information related to the transportation means, and may be related to the location of the transportation means. In some embodiments, the transportation means information includes a first navigation distance between the mobile terminal and the transportation means.

In the embodiments of the present disclosure, unless otherwise specified, "first", "second", "third", "fourth", and similar terms are not used to represent sequences, priorities, etc., but only for the need to distinguish between each other.

In the embodiments of the present disclosure, the destination information may include any information related to the destination. In some embodiments, the destination information includes a second navigation distance between the mobile terminal and the destination. When the mobile terminal is located in the transportation means, the second navigation distance between the mobile terminal and the destination is also the second navigation distance between the transportation means and the destination.

Assisting in the travel arrangement based on at least one of the transportation means information or the destination information (48) may be performed by the mobile terminal, or may be performed by a server connected to the mobile terminal. If assisting in the travel arrangement based on at least one of the transportation means information or the destination information (48) is performed by the mobile terminal, it may be performed by the application program. Assisting in the travel arrangement based on at least one of the transportation means information or the destination information (48) can be performed automatically without manual intervention, thereby facilitating relatively simple and intelligent travel arrangements.

In some embodiments, assisting in the travel arrangement based on at least one of the transportation means information or the destination information (48) includes: if the first navigation distance is less than a first value and the second navigation distance is greater than a second value, arranging the transportation means to travel. The first value and the second value can be set and selected in advance as required. For example, the first value may be hundreds of meters, no more than 1 kilometer, or no more than 10 kilometers, and the second value may be several kilometers, greater than or equal to 1 kilometer, or greater than or equal to 2 kilometers.

In some embodiments, assisting in the travel arrangement based on at least one of the transportation means information or the destination information (48) includes: providing a first navigation to the transportation means. For example, when the first navigation distance is greater than 0, the first navigation may be provided as required. The first navigation may be provided by the mobile terminal. When the first navigation is provided by the mobile terminal, it may be provided by the application program.

In some embodiments, assisting in the travel arrangement based on at least one of the transportation means information or the destination information (48) includes: activating the second navigation of the transportation means. The second navigation may be activated by the mobile terminal, or by a server connected to the mobile terminal and the transportation means, or by the transportation means. The activation of the second navigation can be carried out automatically without manual intervention, thereby facilitating relatively simple and intelligent travel arrangements.

In some embodiments, the second navigation is a navigation from the location of the transportation means to the location of the destination. In this way, reaching the location of the destination from the location of the transportation means may be facilitated. The second navigation is also a navigation from the location of the mobile terminal to the location of the destination when the mobile terminal is located in the transportation means.

Before the second navigation is activated, the transportation means and the mobile terminal may be in the connected state or in the unconnected state. In some embodiments, when the transportation means is coupled with the mobile terminal, the second navigation is activated. In this way, the second navigation can be activated directly by the mobile terminal, e.g., by the application program of the mobile terminal, without using the mobile terminal to provide the second navigation, and without manually operating the transportation means. That is, the transportation means can provide the second navigation, thereby facilitating relatively simple and intelligent travel arrangements.

In some embodiment, assisting in the travel arrangement based on at least one of the transportation means information or the destination information (48) includes: if the first navigation distance is greater than the first value and the second navigation distance is greater than the second value, arranging other transportation means to travel. The first value and the second value can be set and selected in advance as required. For example, the first value may be hundreds of meters, no more than 1 kilometer, or no more than 10 kilometers, and the second value may be several kilometers, greater than or equal to 1 kilometer, or greater than or equal to 2 kilometers.

In the embodiments of the present disclosure, the other transportation means may be any transportation means that has not yet corresponded to the mobile terminal, such as a transportation means that has not been registered in the application program of the mobile terminal and has no right to use, or a transportation means that has not obtained a use license and needs to be rented. The other transportation means may be a motor transportation means or a non-motor transportation means.

In the embodiments of the present disclosure, the transportation means information may include any information related to the transportation means, and may be related to the status and the location of the transportation means. In some embodiments, the transportation means information includes a driving range of the transportation means, and a driving distance between the transportation means and the destination. The driving distance may be a navigation distance between the transportation means and the destination.

In some embodiments, assisting in the travel arrangement based on at least one of the transportation means information or the destination information (48) includes: if the driving range of the transportation means is less than the driving distance between the transportation means and the destination, arranging the transportation means to refill or recharge the energy source as required for the trip or arranging other transportation means to travel. The energy source may be fuel, electric energy, and the like.

In some embodiments, assisting in the travel arrangement based on at least one of the transportation means information or the destination information (48) includes: handling the rental service of other transportation means. The handling of the rental service of the other transportation means may be performed by the mobile terminal, or by a server connected to the mobile terminal. If performed by the mobile terminal, it may be performed by the application program. It can be done automatically without manual intervention, thereby facilitating easier and more intelligent travel arrangements.

In some embodiments, assisting in the travel arrangement based on at least one of the transportation means information or the destination information (48) includes: using the transportation means as a voucher or a guarantee for renting the other transportation means. In this way, it can help to omit additional processes such as payment and refund of deposits, and the travel can be arranged more easily and intelligently. When the user does not return the other transportation means or the returned transportation means has a problem, the user can be found liable according to the transportation means, or the transportation means of the user can be locked or apprehended.

In some embodiments, assisting in the travel arrangement based on at least one of the transportation means information or the destination information (48) includes: receiving by the mobile terminal an electronic key of the other transportation means. Thus, it facilitates taking the other transportation means and making the travel arrangement more easily and intelligently. The electronic key of the other transportation means may be received by the application program.

In some embodiments, assisting in the travel arrangement based on at least one of the transportation means information or the destination information (48) further includes: displaying at least one of a location of the other transportation means or a third navigation distance between the mobile terminal and the other transportation means. The mobile terminal may, for example via the application program, display at least one of the location of the other transportation means or the third navigation distance between the mobile terminal and the other transportation means to provide assistance of going to and picking up the other transportation means.

In some embodiments, assisting in the travel arrangement based on at least one of the transportation means information or the destination information (48) includes: activating the third navigation to the other transportation means. The mobile terminal may, for example, activate the third navigation through the application program to provide assistance for going to and picking up the other transportation means.

In the embodiments of the present disclosure, the destination information may include any information related to the destination. In some embodiments, the destination information includes the second navigation distance between the mobile terminal and the destination, and assisting in the travel arrangement based on at least one of the transportation means information or the destination information (48) further includes: if the second navigation distance is less than the second value, arranging to walk. The second value can be set and selected in advance as required. For example, the second value may be several kilometers, greater than or equal to 1 kilometer, or greater than or equal to 2 kilometers.

In some embodiments, assisting in the travel arrangement based on at least one of the transportation means information or the destination information (48) includes: activating the second navigation between the mobile terminal and the destination. The mobile terminal may initiate the second navigation, for example via the application program, to provide assistance for getting to the destination.

Another aspect of the present disclosure relates to a computer storage medium, storing a computer program including program instructions. When the program instructions are executed by a processor, the above-mentioned method for assisting in the travel arrangement is performed. The computer storage medium may include a read-only memory (Read-Only Memory, ROM), a random-access memory (Random Access Memory, RAM), a magnetic disk or an optical disk, and the like. The computer storage medium may also include a non-volatile memory, or a non-transitory memory, and the like.

For example, in the method for assisting in the travel arrangement provided by the present disclosure, a scenario where the computer storage medium can be applied may include the following. For example, the user takes out the mobile phone and sends a voice instruction to the application program, "go to destination A". The application program obtains the first navigation distance to the vehicle registered therein, and the first navigation distance is less than 1 kilometer. The application program obtains the second navigation distance from the destination A, and the second navigation distance is greater than 5 kilometers. To arrange the travel for the vehicle, the application program provides the corresponding vehicle with the first navigation. Upon arrival at the vehicle, the application program unlocks the vehicle with the included electronic key. The application program activates the second navigation from the location of the vehicle to the location of the destination. The vehicle-mounted screen of the vehicle displays the distance from the current location to the destination A, the navigation route, the arrival time and so on.

In another example, the user takes out the mobile phone and sends the voice instruction to the application program, "go to destination B", and the application program obtains the first navigation distance with the vehicle registered therein, and the first navigation distance is greater than 1 kilometer. The application program obtains the second navigation distance from the destination B, and the second navigation distance is greater than 5 kilometers. The application program arranges the other vehicle to travel. The application program receives the electronic key of the other vehicle by using the vehicle as a voucher or a guarantee for renting the other vehicle. The application program provides the other vehicle with the third navigation. After arriving at the other vehicle, the application program uses the received electronic key to open the other vehicle. The application program activates the navigation from the location of the other vehicle to the location of the destination B. The vehicle-mounted screen of the other vehicle displays the distance from the current location to the destination B, the navigation route, the arrival time, and the like.

As can be seen from the above, in the embodiment of the present disclosure, the user may travel in various manners. The user may drive by oneself. The user may rent the other vehicle. The user may walk. The user may use the same method for assisting in the travel arrangement to input information through the same application program. It is simpler and more intelligent to input the information in this way as compared to going through multiple software applications to achieve different modes of travel.

Although the embodiments of the present disclosure have been disclosed above, the present disclosure is not limited thereto. Any person skilled in the art can make various changes and modifications without departing from the spirit and scope of the present disclosure, so the protection scope of the present invention should be based on the scope defined in the claims.

What is claimed is:

1. A method for assisting in a travel arrangement comprising:

receiving, by a mobile terminal, a travel instruction, the travel instruction including a destination;

obtaining vehicle information of a vehicle corresponding to the mobile terminal;

obtaining destination information of the destination; and assisting in the travel arrangement based on at least one of the vehicle information or the destination information wherein the vehicle information includes a first navigation distance between the mobile terminal and the vehicle, and the destination information includes a second navigation distance between the mobile terminal and the destination; and wherein assisting in the travel arraignment based on at least one of the vehicle information or the destination information includes arranging the vehicle to travel in response to the first navigation distance being smaller than a first value and the second navigation distance being greater than a second value; and wherein assisting in the travel arrangement based on at least one of the vehicle information or the destination information further includes the step of receiving, by an application program, an electronic key that unlocks the vehicle.

2. The method according to claim 1, wherein the mobile terminal includes an electronic key of the vehicle.

3. The method according to claim 1, wherein the mobile terminal includes an application program, and the vehicle information includes vehicle information of the vehicle registered in the application program.

4. The method according to claim 3, wherein the application program includes the electronic key of the vehicle.

5. The method according to claim 1, wherein assisting in the travel arrangement based on at least one of the vehicle information or the destination information further includes:

providing a first navigation to the vehicle.

6. The method according to claim 1, wherein assisting in the travel arrangement based on at least one of the vehicle information or the destination information further includes:

activating a second navigation, wherein the second navigation navigates from a location of the vehicle to the destination.

7. The method according to claim 6, further comprising:

in response to the vehicle being connected to the mobile terminal, activating the second navigation.

8. The method according to claim 1, wherein assisting in the travel arrangement based on at least one of the vehicle information or the destination information further includes:

in response to the first navigation distance being greater than the first value and the second navigation distance being greater than the second value, arranging another vehicle to travel.

9. The method according to claim 1, wherein the vehicle information includes a driving range of the vehicle, and a driving distance between the location of the vehicle and the destination, and assisting in the travel arrangement based on at least one of the vehicle information or the destination information further includes: in response to the driving range of the vehicle being smaller than the driving distance between the location of the vehicle and the destination, arranging the vehicle to refill or recharge an energy source as required for a trip or arranging the other vehicle to travel.

10. The method according to claim 8, wherein assisting in the travel arrangement based on at least one of the vehicle information or the destination information further includes handling a rental service of the other vehicle, or using the vehicle as a voucher or a guarantee for renting the other vehicle.

11. The method according to claim 8, wherein assisting in the travel arrangement based on at least one of the vehicle information or the destination information further includes receiving an electronic key of the other vehicle by the mobile terminal.

12. The method according to claim 8, wherein assisting in the travel arrangement based on at least one of the vehicle information or the destination information further includes displaying at least one of a location of the other vehicle or a third navigation distance between the mobile terminal and the location of the other vehicle.

13. The method according to claim 8, wherein assisting in the travel arrangement based on at least one of the vehicle information or the destination information further includes activating a third navigation to get to the location of the other vehicle.

14. The method according to claim 1, wherein:

the destination information includes the second navigation distance between the mobile terminal and the destination; and assisting in the travel arrangement based on at least one of the vehicle information or the destination information further includes:

in response to the second navigation distance being smaller than the second value, arranging to walk.

15. The method according to claim 14, wherein assisting in the travel arrangement based on at least one of the vehicle information or the destination information further includes:

activating the second navigation from the mobile terminal to the destination.

16. A method for assisting in a travel arrangement comprising:

receiving, by a device terminal, a travel instruction, the travel instruction including a destination;

obtaining transportation means information of a transportation means corresponding to the device terminal;

obtaining destination information of the destination; and assisting in the travel arrangement based on at least one of the transportation means information or the destination information wherein the transportation means information includes a first navigation distance between the device terminal and the transportation means, and the destination information includes a second navigation distance between the device terminal and the destination; and wherein assisting in the travel arraignment based on at least one of the transportation means information or the destination information includes arranging the transportation means to travel in response to the first navigation distance being smaller than a first value and the second navigation distance being greater than a second value; and wherein assisting in the travel arrangement based on at least one of the vehicle information or the destination information further includes the step of receiving, by an application program, an electronic key that unlocks the vehicle.

17. A non-transitory computer readable storage medium, wherein:

the storage medium stores a computer program including program instructions; and when being executed by a processor, the program instructions cause the processor to perform:

receiving, by a mobile terminal, a travel instruction, the travel instruction including a destination;

obtaining vehicle information of a vehicle corresponding to the mobile terminal;

obtaining destination information of the destination; and assisting in the travel arrangement based on at least one of the vehicle information or the destination information wherein the vehicle information includes a first navigation distance between the mobile terminal and the vehicle, and the destination information includes a second navigation distance between the mobile terminal and the destination; and wherein assisting in the travel arraignment based on at least one of the vehicle information or the destination information includes arranging the vehicle to travel in response to the first navigation distance being smaller than a first value and the second navigation distance being greater than a second value; and wherein assisting in the travel arrangement based on at least one of the vehicle information or the destination information further includes the step of receiving, by an application program, an electronic key that unlocks the vehicle.

* * * * *